(12) United States Patent
Gupta

(10) Patent No.: US 7,931,087 B2
(45) Date of Patent: Apr. 26, 2011

(54) METHOD OF FRACTURING USING LIGHTWEIGHT POLYAMIDE PARTICULATES

(75) Inventor: D. V. Satyanarayana Gupta, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 800 days.

(21) Appl. No.: 11/370,768

(22) Filed: Mar. 8, 2006

(65) Prior Publication Data

US 2007/0209795 A1 Sep. 13, 2007

(51) Int. Cl.
*E21B 43/267* (2006.01)
(52) U.S. Cl. ............... 166/308.1; 166/276; 166/278; 166/280.2
(58) Field of Classification Search .................. None
See application file for complete search history.

(56) References Cited

U.S. PATENT DOCUMENTS

| | | |
|---|---|---|
| 3,266,573 A | 8/1966 | Rixie |
| 4,033,415 A | 7/1977 | Holtmyer et al. |
| 4,470,915 A | 9/1984 | Conway |
| 4,477,360 A | 10/1984 | Almond |
| 4,502,967 A * | 3/1985 | Conway ................ 507/203 |
| 4,553,601 A * | 11/1985 | Almond et al. ........... 166/308.5 |
| 5,422,183 A | 6/1995 | Sinclair et al. |
| 5,531,274 A | 7/1996 | Bienvenu, Jr. |
| 5,597,784 A | 1/1997 | Sinclair et al. |
| 5,801,116 A | 9/1998 | Cottrell et al. |
| 5,837,656 A | 11/1998 | Sinclair et al. |
| 5,955,144 A | 9/1999 | Sinclair et al. |
| 6,059,034 A | 5/2000 | Rickards et al. |
| 6,330,916 B1 | 12/2001 | Rickards et al. |
| 6,364,018 B1 | 4/2002 | Brannon et al. |
| 6,406,789 B1 | 6/2002 | McDaniel et al. |
| 6,439,309 B1 * | 8/2002 | Matherly et al. ........... 166/276 |
| 6,508,305 B1 | 1/2003 | Brannon et al. |
| 6,528,157 B1 | 3/2003 | Hussain et al. |
| 6,582,819 B2 | 6/2003 | McDaniel et al. |
| 6,599,863 B1 | 7/2003 | Palmer et al. |
| 6,632,527 B1 | 10/2003 | McDaniel et al. |
| 6,767,868 B2 | 7/2004 | Dawson et al. |
| 6,772,838 B2 | 8/2004 | Dawson et al. |
| 6,844,296 B2 | 1/2005 | Dawson et al. |
| 6,892,813 B2 | 5/2005 | Nguyen et al. |
| 6,983,797 B2 | 1/2006 | Nguyen et al. |
| 6,983,801 B2 | 1/2006 | Dawson et al. |
| 7,036,589 B2 | 5/2006 | Nguyen |
| 7,067,459 B2 | 6/2006 | Pakulski et al. |
| 7,135,231 B1 | 11/2006 | Sinclair et al. |
| 7,455,106 B2 | 11/2006 | Veneruso et al. |
| 7,207,386 B2 | 4/2007 | Brannon et al. |
| 7,210,528 B1 | 5/2007 | Brannon et al. |
| 7,213,651 B2 | 5/2007 | Brannon et al. |
| 7,228,904 B2 | 6/2007 | Todd et al. |
| 7,255,168 B2 | 8/2007 | Nguyen |
| 7,255,169 B2 | 8/2007 | van Batenburg et al. |
| 7,281,580 B2 | 10/2007 | Parker et al. |
| 7,322,411 B2 | 1/2008 | Brannon et al. |
| 7,334,635 B2 | 2/2008 | Nguyen |
| 7,334,636 B2 | 2/2008 | Nguyen |
| 7,427,583 B2 | 9/2008 | Couillet et al. |
| 7,494,711 B2 * | 2/2009 | Kaufman et al. ............. 428/403 |
| 2004/0040708 A1 | 3/2004 | Stephenson et al. |
| 2005/0006095 A1 | 1/2005 | Justus et al. |
| 2005/0272611 A1 | 12/2005 | Lord et al. |
| 2005/0274510 A1 | 12/2005 | Nguyen et al. |
| 2005/0284631 A1 | 12/2005 | Nguyen et al. |
| 2006/0065398 A1 | 3/2006 | Brannon et al. |
| 2006/0073980 A1 | 4/2006 | Brannon et al. |
| 2006/0258546 A1 | 11/2006 | Brannon et al. |
| 2007/0036967 A1 | 2/2007 | Estur et al. |
| 2007/0173414 A1 * | 7/2007 | Wilson .......................... 507/240 |
| 2007/0209794 A1 | 9/2007 | Kaufman et al. |

FOREIGN PATENT DOCUMENTS

GB 2319796 B 8/2001
WO WO 2006/082416 8/2006

OTHER PUBLICATIONS

Diversified Industries Ltd.; "Lightweight Proppant Product Development", undated.
Rhodia Engineering Plastics; "Technyl® Polyamide Range"; pp. 1-11; Challenging Boundaries, undated.
Darin, S.R., Huitt, J.L.; "Effect of a Partial Monolayer of Propping Agent on Fracture Flow Capacity" (SPE 1291-G); Petroleum Transactions, AIME; 34th Annual Fall Meeting of SPE; Oct. 4-7, 1959, Dallas, Texas; pp. 31-37.
Brannon, Harold D. et al; "Maximizing Fracture Conductivity wiht Proppant Partial Monolayers: Theoretical Curiosity of Highly Productive Reality?" (SPE 90698); Society of Petroleum Engineers Inc.; 2004; pp. 1-23.
Parker, M. et al; "High-Porosity Fractures Yield High Conductiity" (SPE 96848); Society of Petroleum Engineers Inc.; 2005; pp. 1-10.

* cited by examiner

*Primary Examiner* — Zakiya W. Bates
(74) *Attorney, Agent, or Firm* — John Wilson Jones; Jones & Smith, LLP

(57) ABSTRACT

Lightweight polyamide particulates may be used in treatment of subterranean formations, including hydraulic fracturing and sand control methods, such as gravel packing. The polyamide particulates typically have an apparent specific gravity (ASG) between from about 1.05 to about 2.0 and are stable at temperatures up to 500° C. The polyamide particulates may be used in combination with a filler which further serves to increase the strength and temperature stability of the resulting composite. Fracture conductivity may be increased by the placement of the low density polyamide particulates as a partial monolayer.

24 Claims, 1 Drawing Sheet

METHOD OF FRACTURING USING LIGHTWEIGHT POLYAMIDE PARTICULATES

FIELD OF THE INVENTION

This invention relates generally to methods for treating subterranean formations, such as hydraulic fracturing treatments and sand control. In particular, this invention relates to use of lightweight polyamides as proppant material in hydraulic fracturing treatments or as particulate material in sand control methods such as gravel packing, frac pack treatments, etc.

BACKGROUND OF THE INVENTION

Stimulation procedures often require the use of well treating materials having high compressive strength. In hydraulic fracturing, such materials must further be capable of enhancing the production of fluids and natural gas from low permeability formations. In a typical hydraulic fracturing treatment, fracturing treatment fluid containing a solid proppant material is injected into the wellbore at high pressures. Once natural reservoir pressures are exceeded, the fluid induces fractures in the formation and proppant is deposited in the fracture, where it remains after the treatment is completed. The proppant material serves to hold the fracture open, thereby enhancing the ability of fluids to migrate from the formation to the wellbore through the fracture. Because fractured well productivity depends on the ability of a fracture to conduct fluids from a formation to a wellbore, fracture conductivity is an important parameter in determining the degree of success of a hydraulic fracturing treatment. Choosing a proppant is critical to the success of well stimulation.

Proppants used in the art include sand, glass beads, walnut hulls, and metal shot as well as resin-coated sands, intermediate strength ceramics, and sintered bauxite; each employed for their ability to cost effectively withstand the respective reservoir closure stress environment. The relative strength of these various materials increases with their corresponding apparent specific gravity (ASG), typically ranging from 2.65 for sands to 3.4 for sintered bauxite. Unfortunately, increasing ASG leads directly to increasing degree of difficulty with proppant transport and reduced propped fracture volume, thereby reducing fracture conductivity.

More recently, ultra lightweight (ULW) materials have been used as proppants since they reduce the fluid velocity required to maintain proppant transport within the fracture, which, in turn, provides for a greater amount of the created fracture area to be propped. Exemplary of such proppants are significantly lighter deformable particles. Such ULW proppants, like conventional heavier proppants, have the capability to effectively withstand reservoir closure stress environments while increasing fracture conductivity.

Materials of various specific gravities have been disclosed for use as deformable particulates for downhole conditions. For example, successful deformable particles include modified ground walnut hulls manufactured by impregnating closely sized walnut particles (i.e. 20/30 US mesh) with epoxy or other resins. These impregnated walnut hull particles are then coated with phenolic or other resins. Further exemplary of deformable particles are polystyrene divinylbenzene (PSDVB) deformable beads.

In addition to having low specific gravity, ULW proppants must also be of sufficient strength to withstand the rigors of high temperatures and high stresses downhole. ULW proppants, while offering excellent compressive strength, often soften and loose their compressive strength especially at high temperature and high pressure conditions. For instance, ULW proppants composed of resinous materials have been observed to deform at elevated temperatures to the extent that under a 5,000 psi stress load at temperatures greater than 250° F., the permeability of the ULW proppant pack is deformed beyond the limits of its commercial utility even though the melting point of the resin is at a temperature of well greater than 300° F.

Thus, alternative materials which exhibit high particle strength at high temperatures are needed for utilization in those applications which require high temperature and high pressure downhole conditions.

SUMMARY OF THE INVENTION

Lightweight polyamide particulates are useful in treatment of well penetrating subterranean formations. In a preferred embodiment, lightweight polyamide particulates are used in sand control methods, including gravel packing, as well as hydraulic fracturing.

The lightweight polyamide particulates are characterized by an apparent specific gravity (ASG) between from about 1.05 to about 2.00 and are stable at temperatures up to 500° C. In addition, the polyamide particulates exhibit crush resistance under conditions as high as 10,000 psi closure stress.

The polyamide particulates may be used in combination with one or more fillers which further serve to increase the strength and temperature stability of the resulting composite. Suitable as fillers are minerals, such as finely divided minerals or finely divided minerals and/or fibers, clay, hematite, inorganic salts, kaolin, molybdenum disulfide, oil, alumina, hematite, aluminum flake, stainless steel, silicone, polytetrafluoroethylene, cement, carbon black, carbon Buckminster fullerenes, carbon nano-tubes, polyhedral oligomeric silsesquioxane, metals, metallic oxides, phosphates, borates, calcium carbonate, calcium chloride, calcium bromide, barium sulfate, aluminum flakes, a modified naturally occurring material, crushed nut shells, ground or crushed seed shells, ground or crushed fruit pits, processed wood and organic polymeric materials. Filled polyamides containing such fillers render higher permeability factors than unfilled polyamides.

When used in hydraulic fracturing, a suspension of lightweight and/or substantially neutrally buoyant polyamide particulates in a carrier fluid may be injected into a subterranean formation in conjunction with a hydraulic fracturing treatment or other treatment at pressures sufficiently high enough to cause the formation or enlargement of fractures or to otherwise expose the aggregates to formation closure stress. Such other treatments may be near wellbore in nature (affecting near wellbore regions) and may be directed toward improving wellbore productivity and/or controlling the production of fracture proppant or formation sand. Particular examples include gravel packing and frac-packs.

Fracture conductivity may be increased by use of the low density polyamide proppant as a partial monolayer.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1:
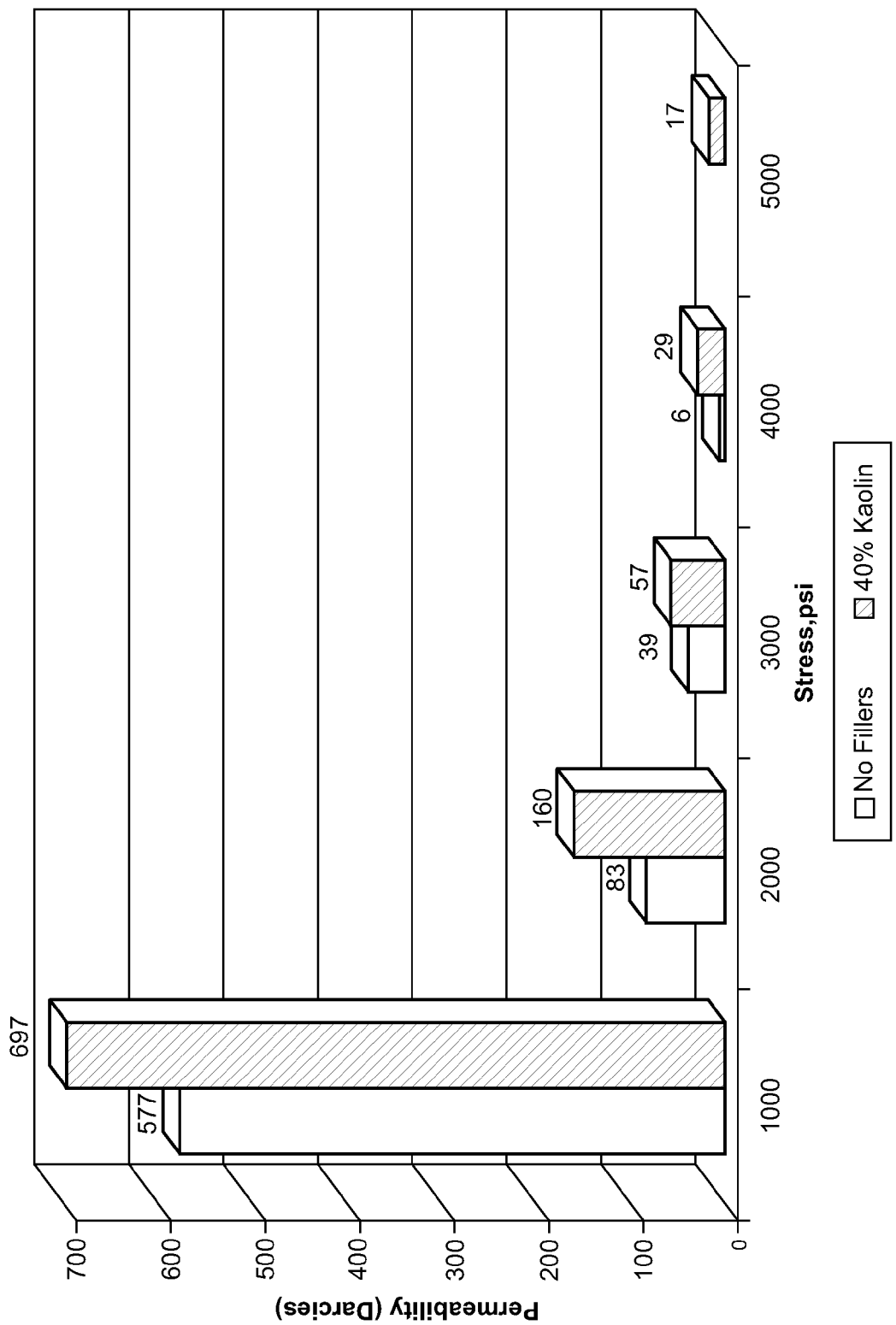
FIG. 1 compares the permeability differences between a filled and an unfilled polyamide proppant used in hydraulic fracturing.

The lightweight and/or substantially neutrally buoyant polyamide proppant or sand control particulates for use in the treatment of well penetrating subterranean formations, in accordance with the invention, have low specific gravity and are stable at temperatures up to 500° C.

The lightweight polyamide particulates exhibit crush resistance under conditions as high as 10,000 psi closure stress, API RP 56 or API RP 60, generally between from about 250 to about 8,000 psi closure stress. For instance, the polyamide particulates may be employed as proppant/sand control particulates at temperatures as high as, for example, 700° F. and pressures up to about 8,000 psi.

The lightweight polyamide particulate are characterized by an apparent specific gravity (ASG) (API RP 60) which is substantially less than the ASG of a conventional particulate material employed in hydraulic fracturing or sand control operations. Since polyamides, such as nylon, exhibit low molecular weight, the ASG of the proppant is typically between from about 1.05 to about 2.00. In a preferred embodiment, the polyamide particulate has an ASG less than or equal to 1.75, most preferably less than or equal to 1.50.

The thermoplastic polyamide particulates are further non-reactive in that they are not curable at in-situ temperatures or elevated heat conditions. Being thermoplastic, the polyamide particulates for use in the invention may be employed in the absence of a cold set resin, binder or cementitious agent. Preferred polyamides include polyamide-6, 6 as well as polyamide 6, such as Technyl® polyamides from Rhodia Engineering Plastics. Further suitable polyamides are polyamide 6,10; polyamide 6,12; polyamide 4,6, polyamide 11 and polyamide 12.

The polyamide particulates may be of any size or shape suitable for hydraulic fracturing and sand control methodology. In addition to being substantially spherical, such as being beaded, or pelleted, the particulates for use in the invention may be non-beaded and non-spherical such as an elongated, tapered, egg, tear-drop or oval shape or mixtures thereof. For instance, the particulates may have a shape that is cubic, bar-shaped (as in a hexahedron with a length greater than its width, and a width greater than its thickness), cylindrical, multi-faceted, irregular, or mixtures thereof. In addition, the particulates may have a surface that is substantially roughened or irregular in nature or a surface that is substantially smooth in nature. Moreover, mixtures or blends of particulates having differing, but suitable, shapes for use in the disclosed method further be employed.

In one embodiment, when the particulates have a cylindrical shape or an elongated beaded shape with a substantially uniform diameter, the particulates may have a maximum length aspect ratio equal to or less than about 5. As used herein, "maximum length based aspect ratio" means the maximum aspect ratio that may be obtained by dividing the length of the particulate by the minimum (or shortest) dimensional value that exists along any other axis (other than the length axis) taken through the center of mass of the particulate.

The lightweight and/or substantially neutrally buoyant polyamide particulates may be formed from materials that are chipped, ground, crushed, or otherwise processed to produce particulate material having the desired particle size. In one exemplary embodiment, particle sizes include, but are not limited to, sizes ranging from about 4 mesh to about 200 mesh, alternatively from about 12 mesh to about 50 mesh.

Particle size of the disclosed particulate materials may be selected based on factors such as anticipated downhole conditions and/or on relative strength or hardness of the particulate material/s selected for use in a given application. In this regard, larger particle sizes may be more desirable in situations where a relatively lower strength particulate material is employed. For example, 12/20 mesh polyamide particulates may be desirable for use where closure stresses of up to about 1500 psi are anticipated. Smaller particle sizes may be more desirable in situations where a relatively higher strength particulate material is employed. For example 20/40 mesh polyamide particulates may be desirable for use where closure stresses of up to about 4000 psi.

The polyamide particulates deform with stress and yet are sufficiently strong to be used on their own at high pressures. Since breakage is unlikely to occur, the polyamide particulates supporting the fracture walls do not generate fines. They may further be used in conjunction with other well treatment agents including more conventional proppant materials, such as sand.

The polyamide particulates may be used in conjunction with one or more fillers to form a well treating composite. Such fillers are non-reactive and further serve to increase the strength and temperature stability of the polyamide composite as well as to modify the density of the particulate.

The presence of such fillers further render a well treating composite having a ASG different than the ASG of the polyamide particulate. Volume proportions of filler may be selected so as to control crush strength and temperature stability.

Typically, the particle size of the filler range from about 100 nm to about 200 μm.

Suitable as fillers are minerals (such as finely divided minerals or finely divided minerals and/or fibers) optionally bound by a suitable organic or inorganic binder. Suitable minerals include fly ash, silica and sand (including fumed silica, quartz sand, and silica flour), alumina, mica, silicates, such as orthosilicates and metasilicates, aluminum silicate and calcium silicate, kaolin, talc, zirconia, boron and glass, such as glass spheres (especially glass microspheres), glass powder, glass beads, glass bubbles, ground glass, borosilicate glass and fiberglass. Suitable fibers include mineral fibers, glass fibers, ceramic fibers, carbon fibers, polymeric fibers, coated fibers (such as nickel coated carbon fibers) and synthetic fibers. Further, suitable fillers include clay, hematite, alkali metal salts, molybdenum disulfide, oil, aluminum flake, stainless steel, silicone, polytetrafluoroethylene, cement, inorganic salts, carbon black, carbon Buckminster fullerenes, carbon nano-tubes, polyhedral oligomeric silsesquioxane, metals, metallic oxides (such as trimanganese tetraoxide), metallic salts (including alkali metal salts), phosphates, borates, calcium carbonate, calcium chloride, calcium bromide, barium sulfate, aluminum flakes, a modified naturally occurring material, crushed nut shells, ground or crushed seed shells, ground or crushed fruit pits, processed wood and organic polymeric materials. Further, the filler may contain a cation selected from the group consisting of alkali metals, alkaline earth metals, ammonium, manganese, and zinc and an anion selected from the group consisting of a halide, an oxide, a carbonate, nitrate, sulfate, acetate and formate.

The amount of filler(s) in the composite is such as to impart to the well treating composite the desired ASG. Typically, the amount of filler in the well treating composite is between from about 1 to about 85, more typically between from about 25 to about 60, percent by volume of the well treating composite. The amount of filler and polyamide particulate may be adjusted to tailor the composite to achieve the desirable physical properties, including particle density, bulk density, crush strength, etc.

The well treating composites are generally prepared by blending the polyamide particulate with the selected filler(s), in a molten state, and forming a composite of the desired size and physical properties. This can be achieved by known techniques in the powder/particulate industry such as melt processing, cryogenic grinding, etc.

The polyamide particulates may be employed with carrier or treatment fluids in order to facilitate placement of the composite to a desired location within the formation. Any carrier fluid suitable for transporting the particulate into a well and/or subterranean formation fracture in communication therewith may be employed including, but not limited to, carrier fluids including a completion or workover brine, salt water or brine, fresh water, potassium chloride solution, a saturated sodium chloride solution, liquid hydrocarbons or a gas or liquefied gas such as nitrogen or carbon dioxide.

The fluids may be gelled, non-gelled or have a reduced or lighter gelling requirement as compared to carrier fluids employed with conventional fracture treatment/sand control methods. The latter may be referred to as "weakly gelled", i.e., having minimum sufficient polymer, thickening agent, such as a viscosifier, or friction reducer to achieve friction reduction when pumped downhole (e.g., when pumped down tubing, work string, casing, coiled tubing, drill pipe, etc.), and/or may be characterized as having a polymer or viscosifier concentration of from greater than 0 pounds of polymer per thousand gallons of base fluid to about 10 pounds of polymer per thousand gallons of base fluid, and/or as having a viscosity of from about 1 to about 10 centipoises. The non-gelled carrier fluid typically contains no polymer or viscosifier.

Gelling agents for proppant carrier fluids may provide a source of proppant pack and/or formation damage, and settling of proppant may interfere with proper placement downhole. The resulting suspension preferably forms a pack of particulate material that is permeable to fluids produced from the wellbore and substantially prevents or reduces production of formation materials from the formation into the wellbore.

The carrier or fracturing fluid may further contain one or more conventional additives to the well service industry such as a gelling agent, crosslinking agent, gel breaker, surfactant, biocide, surface tension reducing agent, foaming agent, defoaming agent, demulsifier, non-emulsifier, scale inhibitor, gas hydrate inhibitor, polymer specific enzyme breaker, oxidative breaker, buffer, clay stabilizer, acid, buffer, solvent or a mixture thereof and other well treatment additives known in the art. The addition of such additives to the carrier fluids minimizes the need for additional pumps required to add such materials on the fly.

The polyamide particulates may be advantageously pre-suspended as a substantially neutrally buoyant particulate and stored in the carrier fluid (e.g., brine of near or substantially equal density), and then pumped or placed downhole as is, or diluted on the fly.

The term "substantially neutrally buoyant" refers to polyamide particulates that have an ASG sufficiently close to the ASG of the selected ungelled or weakly gelled carrier fluid (e.g., ungelled or weakly gelled completion brine, other aqueous-based fluid, slick water, or other suitable fluid) which allows pumping and satisfactory placement of the proppant/particulate using the selected ungelled or weakly gelled carrier fluid. For example, polyamides having an ASG of from about 1.25 to about 1.35 may be employed as a substantially neutrally buoyant proppant/particulate in completion brine having an ASG of about 1.2.

In a preferred embodiment the lightweight polyamide proppant or particulates are suspended in a carrier fluid and introduced into the subterranean formation at a pressure above a fracturing pressure of the subterranean formation. In this method, at least a portion of the particulate material is substantially neutrally buoyant in the carrier fluid. Further, the lightweight polyamide and/or substantially neutrally buoyant proppant or particulate is used in a sand control method for a wellbore penetrating a subterranean formation and may be introduced into the wellbore in a slurry with a carrier fluid; the particulate material being placed adjacent the subterranean formation to form a fluid-permeable pack that is capable of reducing or substantially preventing the passage of formation particles from the subterranean formation into the wellbore while at the same time allowing passage of formation fluids from the subterranean formation into the wellbore. In this method at least a portion of the individual particles of the particulate material may be substantially neutrally buoyant in the carrier fluid.

The polyamide particulates are easy to place within a targeted zone due to lessened settling constraints. The reduced mass of the polyamide particulates is generally required to fill an equivalent volume than is required with conventional sand control particulates used, for example, for gravel packing purposes.

When employed in well treatments, the lightweight and/or substantially neutrally buoyant particulates may be introduced into the wellbore at any concentration deemed suitable or effective for the downhole conditions to be encountered. For example, a well treatment fluid may include a suspension of proppant or sand control aggregates.

The low ASG of the polyamide particulate and/or substantially neutrally buoyant polyamide particulate may result in a larger fracture or frac pack width for the same loading (i.e., pound per square foot of proppant) to give much larger total volume and increased width for the same mass. Alternatively, this characteristic allows for smaller masses of proppant or sand control particulates to be pumped while still achieving an equivalent width.

The use of a non-gelled carrier fluid eliminates a source of potential proppant pack and/or formation damage and enhancement of well productivity. Elimination of the need to formulate a complex suspension gel may further mean a reduction in tubing friction pressures, particularly in coiled tubing and in the amount of on-location mixing equipment and/or mixing time requirements, as well as reduced costs. In one embodiment employing a substantially neutrally buoyant polyamide particulate and a brine carrier fluid, mixing equipment need only include such equipment that is capable of (a) mixing the brine (dissolving soluble salts), and (b) homogeneously dispersing in the substantially neutrally buoyant polyamide particulate.

When used in hydraulic fracturing, the composite may be injected into a subterranean formation in conjunction with a hydraulic fracturing fluid at pressures sufficiently high enough to cause the formation or enlargement of fractures.

The polyamide particulates may be mixed with the carrier fluid in any manner suitable for delivering the mixture to a wellbore and/or subterranean formation. In one embodiment, the disclosed particulates may be injected into a subterranean formation in conjunction with a hydraulic fracturing treatment or other treatment at pressures sufficiently high enough to cause the formation or enlargement of fractures, or to otherwise expose the particles to formation closure stress.

Such other treatments may be near wellbore in nature (affecting near wellbore regions) and may be directed toward improving wellbore productivity and/or controlling the production of fracture proppant or formation sand. Particular examples include gravel packing and "frac-packs." Moreover, such particulates may be employed alone as a fracture proppant/sand control particulate, or in mixtures in amounts and with types of fracture proppant/sand control materials, e.g., conventional fracture or sand control particulate.

The composites of the invention are particularly effective in hydraulic fracturing as well as sand control fluids such as water, salt brine, slickwater such as slick water fracture treatments at relatively low concentrations to achieve partial monolayer fractures, low concentration polymer gel fluids (linear or crosslinked), foams (with gas) fluid, liquid gas such as liquid carbon dioxide fracture treatments for deeper proppant penetration, treatments for water sensitive zones, and treatments for gas storage wells. The polyamide particulates demonstrate strong stability in liquid carbon dioxide.

The diameter of the proppant pack is substantially similar to the width of the created fracture. Fracture conductivity may be increased by the placement of the low density polyamide particulates as a partial monolayer to support the fracture. Fractures containing polyamide partial monolayers exhibit vacant areas around and between particulates which thereby increases the relative conductivity of the propped fracture. The polyamide monolayer is created when the propped fracture has a width that is equal to one particle diameter with no remaining voids into which additional particles may be placed. While the packing of a complete monolayer of proppant is 2 pounds per square foot, the packing of a partial monolayer of proppant is typically between from about 0.02 to about 0.8 lbs. per sq. ft for a polyamide proppant with ASG between 1.1 and 1.5. Such packing causes an increase in porosity of the fracture. The resulting partial monolayer of polyamide particulate as proppant exhibits greater conductivity than that evidenced with the complete monolayer. For instance, at 4000 plus psi, the permeability of a formation has been seen to be much higher than a 1 lb per square foot pack polyamide proppant. Testing protocols for determination of proppant packing are set forth in Harold D. Brannon et al., "Maximizing Fracture Conductivity with Proppant Partial Monolayers; Theoretical Curiosity or Highly Productive Reality?", Paper SPE 90698, presented at the 2004 SPE Annual Technical Conference and Exhibition, Houston, Tex., Sep. 26-29, 2004, herein incorporated by reference.

The polyamide particulates may be employed to simplify hydraulic fracturing treatments or sand control treatments performed through coil tubing, by greatly reducing fluid suspension property requirements. When placed downhole, the polyamide particulates exhibit a much reduced propensity to settle (as compared to conventional proppant or sand control particulates), particularly in highly deviated or horizontal wellbore sections.

In this regard, the polyamide particulates may be advantageously employed in any deviated well having an angle of deviation of between about 0° and about 90° with respect to the vertical. However, in one embodiment, the polyamide particulates may be advantageously employed in horizontal wells, or in deviated wells having an angle with respect to the vertical of between about 30° and about 90°, alternatively between about 75° and about 90°.

The polyamide particulate may be introduced as part of a treating fluid into a well down wellbore tubulars (e.g., tubing, workstring, casing, drill pipe) or down coiled tubing, for example at concentrations of about 0.25 to about 15 pounds per gallon of treating fluid. In one exemplary embodiment, specific gravity of the polyamide particulates may be about 1.5, and therefore they may be used as a substantially neutrally buoyant proppant or sand control particulate in light or heavy brines, thus eliminating the need for complex crosslinked fracturing or sand control carrier fluids.

The polyamide particulates may further be utilized as particulate/proppant material at more severe or demanding downhole conditions (e.g., at higher downhole temperatures and/or under higher downhole conditions of closure stress) than the conditions under which conventional particulates are suitably employed. For example, in one exemplary embodiment, the polyamide particulate may be formulated as described herein and introduced or pumped (e.g., as neutrally buoyant proppant and/or sand control particulate) in any suitable carrier fluid (e.g., saturated sodium chloride solution carrier fluid or other completion or workover brine) into a well for exposure to downhole temperatures of greater than or equal to about 300° F.

In one exemplary embodiment, a gravel pack operation may be carried out on a wellbore that penetrates a subterranean formation to prevent or substantially reduce the production of formation particles into the wellbore from the formation during production of formation fluids. The subterranean formation may be completed so as to be in communication with the interior of the wellbore by any suitable method known in the art, for example by perforations in a cased wellbore, and/or by an open hole section. A screen assembly such as is known in the art may be placed or otherwise disposed within the wellbore so that at least a portion of the screen assembly is disposed adjacent the subterranean formation. A slurry including the lightweight and/or substantially neutrally buoyant particulates and a carrier fluid may then be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during production of fluids from the formation, while at the same time allowing passage of formation fluids from the subterranean formation through the screen into the wellbore. It is possible that the slurry may contain all or only a portion of the lightweight and/or substantially neutrally buoyant particulates. In the latter case, the balance of the particulate material of the slurry may be another material, such as a conventional gravel pack or sand control particulate.

As an alternative to use of a screen, the sand control method may use the lightweight polyamide and/or substantially neutrally buoyant particulates in accordance with any method in which a pack of particulate material is formed within a wellbore that it is permeable to fluids produced from a wellbore, such as oil, gas, or water, but that substantially prevents or reduces production of formation materials, such as formation sand, from the formation into the wellbore. Such methods may or may not employ a gravel pack screen, may be introduced into a wellbore at pressures below, at or above the fracturing pressure of the formation, such as frac pack, and/or may be employed in conjunction with resins such as sand consolidation resins if so desired.

EXAMPLES

The following examples will illustrate the practice of the present invention in its preferred embodiments. All parts are given in terms of weight units except as may otherwise be indicated. Other embodiments within the scope of the claims herein will be apparent to one skilled in the art from consideration of the specification and practice of the invention as disclosed herein. It is intended that the specification, together with the Examples, be considered exemplary only, with the scope and spirit of the invention being indicated by the claims which follow.

Example 1

A polyamide composite containing 40 weight percent kaolin was obtained from Rhodia Engineering Plastics. The ASG of the composite was 1.46 and the bulk density was 0.87 g/cc and the size was about a 36/60 mesh and the shape was substantially spherical.

Conductivity tests were performed according to a modified API RP 61 (1$^{st}$ Revision, Oct. 1, 1989) using an API conductivity cell with Ohio sandstone wafer side inserts to simulate the producing formation. A multilayer pack of the composite containing about 31.5 g of proppant was then loaded between the sealed sandstone wafers to increase the propped width. The proppant pack exhibited a density of about 1 lb/ft$^2$.

The conductivity cell was then placed on a press while stress was applied at 100 psi/minute until the target temperature was reached. Fluid was then allowed to flow through the test pack maintaining Darcy flow. The differential pressure was measured across 5 inches of the pack using a "ROSEMOUNT" differential pressure transducer (#3051C). Flow was measured using Micromotion mass flow meters and data points were recorded every 2 minutes for 50 hours. An Isco 260D programmable pump applied and maintained effective closure pressure.

Experimental parameters and results are set forth in Table I below:

TABLE I

Temperature: 53.4° C.
Closure Pressure (psi): 2000-6000
Fluid pressure (psi): 500

| Time | Width mm | Conductivity md-ft | Permeability Darcies | Closure Psi |
|---|---|---|---|---|
| 0 | 6.32 | 4722 | 228 | 2110 |
| 10 | 5.97 | 4897 | 250 | 1949 |
| 20 | 5.97 | 4687 | 239 | 2030 |
| 30 | 5.97 | 4699 | 240 | 2030 |
| 40 | 6.17 | 4559 | 333 | 2029 |
| 50 | 6.17 | 4509 | 330 | 2024 |
| 0 | 5.84 | 3757 | 196 | 2601 |
| 10 | 3.77 | 1597 | 129 | 4016 |
| 20 | 3.77 | 1600 | 129 | 4016 |
| 30 | 3.77 | 1599 | 129 | 4016 |
| 40 | 3.74 | 1459 | 119 | 4012 |
| 50 | 3.72 | 1408 | 115 | 4012 |
| 60 | 3.71 | 1348 | 111 | 4009 |
| 70 | 3.70 | 1339 | 110 | 4005 |
| 80 | 3.70 | 1335 | 110 | 4005 |
| 90 | 3.70 | 1328 | 109 | 4005 |
| 100 | 3.69 | 1339 | 110 | 4006 |
| 0 | 3.07 | 595 | 59 | 6006 |
| 10 | 3.07 | 322 | 32 | 6006 |
| 20 | 3.42 | 291 | 26 | 6034 |
| 30 | 3.38 | 238 | 22 | 6033 |
| 40 | 3.38 | 392 | 35 | 6046 |
| 50 | 3.37 | 350 | 32 | 6038 |
| 60 | 3.43 | 170 | 15 | 6178 |
| 70 | 3.42 | 119 | 11 | 6054 |
| 80 | 3.37 | 117 | 11 | 6052 |

As may be seen from the results of this example, introduction of a polyamide composite archives the requisite fracture conductivity. Further, Table I illustrates high conductivity at increasing stress levels. As shown, significant strength is imparted by the polyamide proppants across the closure range.

Example 2

Conductivity tests were performed on the composite of Example 1 according to the recited procedure at varying temperatures. Experimental parameters and results are shown in Table II below:

TABLE II

Closure Pressure (psi): 5000
Fluid Pressure (psi): 500

| Time Hours | Temp ° C. | Closure Psi | Conductivity md-ft | Width mm | Permeability darcies |
|---|---|---|---|---|---|
| 0 | 24.4 | 1019 | 174988 | 5.11 | 10447 |
| 0 | 65.5 | 1024 | 38164 | 5.03 | 2313 |
| 10 | 65.2 | 1029 | 24054 | 4.98 | 1473 |
| 20 | 64.9 | 1024 | 22784 | 4.95 | 1402 |
| 0 | 65.1 | 5091 | 1793 | 4.01 | 136 |
| 10 | 64.8 | 5096 | 1176 | 3.86 | 93 |
| 20 | 65.2 | 5096 | 1123 | 3.86 | 89 |
| 0 | 74.5 | 5091 | 639 | 3.76 | 52 |
| 10 | 79.4 | 5096 | 529 | 3.73 | 43 |
| 20 | 79.5 | 5018 | 480 | 3.73 | 39 |
| 30 | 79.5 | 5018 | 472 | 3.73 | 38 |
| 40 | 79.5 | 5013 | 385 | 3.73 | 31 |
| 50 | 79.6 | 5018 | 448 | 3.73 | 37 |
| 60 | 79.6 | 5013 | 502 | 3.73 | 41 |
| 70 | 79.3 | 5018 | 423 | 3.71 | 35 |
| 0 | 93.5 | 5013 | 233 | 3.68 | 19 |
| 10 | 93.6 | 5018 | 173 | 3.68 | 14 |
| 20 | 93.4 | 5013 | 192 | 3.68 | 16 |
| 30 | 93.5 | 5013 | 168 | 3.68 | 14 |
| 40 | 93.4 | 5013 | 186 | 3.68 | 15 |
| 50 | 93.5 | 5013 | 169 | 3.68 | 14 |
| 60 | 93.7 | 5018 | 180 | 3.68 | 15 |
| 70 | 93.7 | 5018 | 165 | 3.68 | 14 |

Table II illustrates high conductivity at increasing temperatures while stress is maintained at around 5,000 psi.

Example 3

The polyamide composite of this Example was obtained from pilot run samples. The polyamide composite was prepared as set forth in Example 1 but on a production scale. A partial monolayer proppant pack was created by loading 1.3 grams of proppant as a pack between the sealed sandstone wafers. The proppant pack exhibited a loading of about 0.041 lb/ft$^2$. Conductivity tests were then run as described in Example 1. Experimental parameters and results for the test are shown in Table III below:

TABLE III

Closure Pressure (psi): 1000-6000
Fluid Pressure (psi): 500

| Time Hours | Temp ° C. | Closure Psi | Conductivity md-ft | Width mm | Permeability darcies |
|---|---|---|---|---|---|
| 0 | 65.6 | 1073 | 430904 | 1.08 | 121381 |
| 10 | 113.0 | 1078 | 101466 | 0.884 | 34988 |
| 0 | 110.0 | 2028 | 37598 | 0.884 | 13349 |
| 10 | 110.0 | 2028 | 43136 | 0.818 | 16075 |
| 20 | 110.2 | 2033 | 43085 | 0.800 | 16413 |
| 24 | 111.2 | 2024 | 38225 | 0.782 | 14893 |
| 0 | 110.3 | 4018 | 27210 | 0.696 | 11917 |
| 10 | 109.8 | 4023 | 19153 | 0.691 | 8450 |
| 20 | 109.2 | 4018 | 17119 | 0.681 | 7665 |

TABLE III-continued

Closure Pressure (psi): 1000-6000
Fluid Pressure (psi): 500

| Time Hours | Temp ° C. | Closure Psi | Conductivity md-ft | Width mm | Permeability darcies |
|---|---|---|---|---|---|
| 24 | 110.2 | 4018 | 17426 | 0.676 | 7861 |
| 0 | 110.4 | 6096 | 10465 | 0.368 | 8661 |
| 10 | 110.3 | 6086 | 1368 | 0.351 | 1189 |
| 20 | 110.4 | 6086 | 1209 | 0.338 | 1095 |
| 24 | 109.9 | 6091 | 1185 | 0.323 | 1120 |

Table III shows the effect of varying the closure pressure on the permeability of the pack. As may be seen from the results of this example, use of a partial monolayer of polyamide renders higher permeability than that seen with the conventional polyamide of Example 1. Note, for instance, that at 4000 plus psi, the permeability of the formation is much higher than 1 lb per square foot pack at lower width.

Example 4

Polyamide beads of nylon-6, 6 were obtained from Rhodia Engineering Plastics. The ASG of the polyamide beads was 1.12 and the bulk density was 0.69 g/cc and the size distribution was 8 to 12 mesh. Conductivity tests were performed using 31.5 g of the unfilled polyamide 6, 6 in accordance with the procedures set forth in Example 1. The test parameters and results are set forth in Table IV below.

TABLE IV

Closure Pressure (psi): 1000-4000
Fluid Pressure (psi): 500

| Time Hours | Temp ° C. | Closure Psi | Conductivity md-ft | Width mm | Permeability darcies |
|---|---|---|---|---|---|
| 0 | 26.0 | 1032 | 18627 | 8.05 | 706 |
| 10 | 26.7 | 1033 | 15073 | 6.909 | 665 |
| 24 | 26.7 | 1029 | 12705 | 6.858 | 565 |
| 0 | 25.5 | 4007 | 1670 | 5.639 | 90 |
| 5 | 24.9 | 4008 | 1445 | 5.588 | 79 |
| 0 | 37.0 | 4008 | 694 | 5.334 | 40 |
| 5 | 37.0 | 4008 | 672 | 5.334 | 38 |
| 10 | 50.9 | 4014 | 464 | 5.232 | 27 |
| 20 | 51.0 | 4014 | 421 | 5.232 | 25 |
| 30 | 65.0 | 4008 | 294 | 4.343 | 21 |
| 40 | 65.0 | 4014 | 285 | 4.343 | 20 |
| 50 | 65.0 | 4012 | 278 | 4.318 | 20 |
| 60 | 81.8 | 4013 | 261 | 4.801 | 17 |
| 70 | 79.5 | 4013 | 190 | 4.775 | 12 |
| 80 | 79.5 | 4010 | 184 | 4.775 | 12 |
| 90 | 93.2 | 4009 | 126 | 4.978 | 8 |
| 100 | 93.0 | 4011 | 121 | 4.978 | 7 |
| 110 | 121.7 | 4009 | 59 | 4.928 | 4 |
| 120 | 121.0 | 4013 | 55 | 4.902 | 3 |

As illustrated in Table IV, introduction of polyamide into a formation achieves requisite fracture conductivity.

Example 5

Conductivity tests were conducted at 37° C. with the 31.5 g of the unfilled polyamide beads of Example 4 and 31.5 g of the filled polyamide composite of Example 1. The tests were conducted in accordance with the procedures set forth in Example 1. The results are set forth in Table V below.

TABLE V

Closure Pressure (psi): 1000-5000
Fluid Pressure (psi): 500

| Unfilled polyamide | | | | |
|---|---|---|---|---|
| Time Hours | Closure Psi | Conductivity md-ft | Width mm | Permeability Darcies |
| 0 | 994 | 16674 | 6.12 | 830 |
| 10 | 991 | 11458 | 6.05 | 577 |
| 0 | 1991 | 4093 | 5.56 | 225 |
| 10 | 1997 | 2701 | 5.23 | 157 |
| 20 | 1997 | 2263 | 5.23 | 132 |
| 30 | 1994 | 1995 | 5.21 | 117 |
| 40 | 1996 | 1808 | 5.18 | 106 |
| 50 | 1994 | 1669 | 5.18 | 98 |
| 60 | 1989 | 1564 | 5.18 | 92 |
| 70 | 1992 | 1476 | 5.18 | 87 |
| 80 | 2002 | 1391 | 5.11 | 83 |
| 90 | 2005 | 1321 | 5.11 | 79 |
| 0 | 2963 | 898 | 4.93 | 56 |
| 10 | 2967 | 739 | 4.88 | 46 |
| 20 | 2965 | 692 | 4.85 | 43 |
| 30 | 2963 | 652 | 4.85 | 41 |
| 40 | 2964 | 630 | 4.83 | 40 |
| 50 | 2960 | 614 | 4.78 | 39 |

| Filled polyamide | | | | |
|---|---|---|---|---|
| Time, Hours | Closure, Psi | Conductivity, md-ft | Width, Mls | Permeability, Darcies |
| 0 | 1045 | 11702 | 5.11 | 698 |
| 10 | 1036 | 7686 | 4.97 | 471 |
| 0 | 2007 | 2535 | 4.56 | 169 |
| 10 | 1995 | 2035 | 4.50 | 158 |
| 20 | 1998 | 2005 | 4.11 | 149 |
| 30 | 1998 | 2261 | 4.10 | 168 |
| 40 | 2016 | 2200 | 4.10 | 164 |
| 50 | 2027 | 2194 | 4.09 | 163 |
| 0 | 2936 | 1387 | 3.98 | 106 |
| 10 | 2946 | 785 | 3.93 | 61 |
| 20 | 2937 | 740 | 3.92 | 58 |
| 30 | 2949 | 780 | 3.91 | 61 |
| 40 | 2977 | 745 | 3.91 | 58 |
| 50 | 2985 | 737 | 3.90 | 58 |
| 0 | 4007 | 506 | 3.81 | 40 |
| 10 | 4005 | 407 | 3.78 | 33 |
| 20 | 4002 | 387 | 3.77 | 31 |
| 30 | 4003 | 377 | 3.70 | 31 |
| 40 | 3999 | 365 | 3.66 | 30 |
| 50 | 3999 | 359 | 3.66 | 30 |
| 0 | 5009 | 283 | 3.61 | 24 |
| 10 | 5009 | 224 | 3.56 | 19 |
| 20 | 5009 | 217 | 3.55 | 19 |
| 30 | 5007 | 211 | 3.55 | 18 |
| 40 | 5006 | 209 | 3.54 | 18 |
| 50 | 5007 | 208 | 3.54 | 18 |

Table V illustrates that higher permeability is obtained using filled polyamide composites versus unfilled polyamide. The distinction between filled and unfilled polyamide is graphically displayed in FIG. 1.

From the foregoing, it will be observed that numerous variations and modifications may be effected without departing from the true spirit and scope of the novel concepts of the invention.

What is claimed is:

1. A method of fracturing a subterranean formation which comprises introducing into the formation at a pressure sufficient to create or enlarge fractures in the formation a well treating composite comprising lightweight polyamide particulates and non-reactive filler, wherein the strength of the well treating composite is greater than the strength of the lightweight polyamide particulates and further wherein the lightweight polyamide particulates are not curable at in-situ temperature conditions.

2. The method of claim 1, wherein the lightweight polyamide particulates are substantially spherical.

3. The method of claim 1, wherein the lightweight polyamide particulates are in the shape of beads, pellets, tear-drops, ovals, cubes, bars, cylindrical, multi-faceted, irregular or are elongated or tapered or a mixture thereof.

4. The method of claim 1, wherein the apparent specific gravity (ASG) of the lightweight polyamide comprising the lightweight polyamide particulates of the well treating composite is between from about 1.05 to about 2.0.

5. The method of claim 4, wherein the lightweight polyamide is particulates are nylon-6,6.

6. The method of claim 4, wherein the apparent specific gravity (ASG) of the lightweight polyamide of the well treating composite is less than or equal to 1.75.

7. The method of claim 1, wherein the non-reactive filler is selected from the group consisting of minerals, clay, hematite, kaolin, molybdenum disulfide, oil, alumina, aluminum flake, stainless steel, silicone, polytetrafluoroethylene, cement, inorganic salts, carbon black, carbon Buckminster fullerenes, carbon nano-tubes, polyhedral oligomeric silsesquioxane, metals, metallic oxides, metallic salts, phosphates, borates, aluminum flakes, a modified naturally occurring material, crushed nut shells, ground or crushed seed shells, ground or crushed fruit pits, processed wood and organic polymeric materials or the at least one filler contains a cation selected from the group consisting of alkali metals, alkaline earth metals, ammonium, manganese and zinc and an anion selected from the group consisting of a halide, an oxide, a carbonate, nitrate, sulfate, acetate and formate.

8. The method of claim 1, wherein the non-reactive filler is selected from the group consisting of fly ash, silica, alumina, mica, silicates, kaolin, talc, zirconia, boron, glass, mineral fibers, ceramic fibers, carbon fibers and polymeric and/or synthetic fibers.

9. The method of claim 1, wherein the well treating composite is introduced into the formation in a carrier fluid selected from the group consisting of fresh water, salt water, brine, gas and liquefied gas.

10. The method of claim 9, wherein the carrier fluid is carbon dioxide or nitrogen.

11. The method of claim 1, wherein the temperature stability of the well treating composite is greater than the temperature stability of the lightweight polyamide particulates.

12. The method of claim 1, wherein the well treating composite is introduced into the formation at a concentration sufficient to achieve a partial monolayer fracture.

13. The method of claim 1, wherein the well treating composite is introduced with slickwater into the formation.

14. A method of fracturing a subterranean formation which comprises introducing into the formation at a pressure sufficient to create or enlarge fractures in the formation a well treating composite comprising non-curable lightweight polyamide particulates and non-reactive filler, wherein the strength of the well treating composite is greater than the strength of the non-curable lightweight polyamide particulates and further wherein the composite does not contain a cold set resin, binder or cementitious agent.

15. The method of claim 14, wherein the apparent specific gravity (ASG) of the polyamide comprising the lightweight polyamide particulates is between from about 1.05 to about 2.0.

16. The method of claim 15, wherein the lightweight polyamide is nylon-6,6.

17. The method of claim 14, wherein the at least one filler is selected from the group consisting of minerals, clay, hematite, kaolin, molybdenum disulfide, oil, alumina, aluminum flake, stainless steel, silicone, polytetrafluoroethylene, cement, inorganic salts, carbon black, carbon Buckminster fullerenes, carbon nano-tubes, polyhedral oligomeric silsesquioxane, metals, metallic oxides, metallic salts, phosphates, borates, aluminum flakes, a modified naturally occurring material, crushed nut shells, ground or crushed seed shells, ground or crushed fruit pits, processed wood and organic polymeric materials or the at least one filler contains a cation selected from the group consisting of alkali metals, alkaline earth metals, ammonium, manganese and zinc and an anion selected from the group consisting of a halide, an oxide, a carbonate, nitrate, sulfate, acetate and formate.

18. The method of claim 14, wherein the at least one filler is selected from the group consisting of fly ash, silica, alumina, mica, silicates, kaolin, talc, zirconia, boron, glass, mineral fibers, ceramic fibers, carbon fibers and polymeric and/or synthetic fibers, calcium carbonate, calcium chloride, calcium bromide, barium sulfate and aluminum flakes.

19. The method of claim 14, wherein the amount of filler in the composite is between from about 1 to about 85 volume percent.

20. The method of claim 14, wherein the lightweight polyamide particulates are substantially spherical.

21. The method of claim 14, wherein the lightweight polyamide particulates are in the shape of beads, pellets, tear-drops, ovals, cubes, bars, cylindrical, multi-faceted, irregular or are elongated or tapered or a mixture thereof 22. The method of claim 14, wherein the well treating composite is introduced into the formation in a carrier fluid selected from the group consisting of fresh water, salt water, brine, gas and liquefied gas.

23. The method of claim 22, wherein at least a portion of the polyamide particulates are substantially neutrally buoyant in the carrier fluid.

24. The method of claim 22, wherein the carrier fluid is carbon dioxide or nitrogen.

* * * * *